(12) United States Patent
Naijo et al.

(10) Patent No.: US 7,880,955 B2
(45) Date of Patent: Feb. 1, 2011

(54) ELECTROPHORETIC DISPERSION SOLUTION, IMAGE DISPLAY MEDIUM USING THE SAME, AND IMAGE DISPLAY DEVICE USING THE SAME

(75) Inventors: Yoshihisa Naijo, Kanagawa (JP); Masahiro Yanagisawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 33 days.

(21) Appl. No.: 12/483,448

(22) Filed: Jun. 12, 2009

(65) Prior Publication Data

US 2010/0002287 A1 Jan. 7, 2010

(30) Foreign Application Priority Data

Jul. 3, 2008 (JP) .............................. 2008-174865

(51) Int. Cl.
G02F 1/167 (2006.01)
G02B 26/00 (2006.01)
(52) U.S. Cl. ...................................... 359/296; 345/107
(58) Field of Classification Search ................. 345/107; 359/296
See application file for complete search history.

(56) References Cited

U.S. PATENT DOCUMENTS

| | | |
|---|---|---|
| 2002/0146572 A1 | 10/2002 | Yanagisawa |
| 2002/0185378 A1 | 12/2002 | Honeyman et al. |
| 2003/0230487 A1 | 12/2003 | Yanagisawa |
| 2005/0018273 A1 | 1/2005 | Honeyman et al. |
| 2009/0207476 A1 * | 8/2009 | Yanagisawa et al. ........ 359/296 |

FOREIGN PATENT DOCUMENTS

| | | |
|---|---|---|
| EP | 2141535 A1 * | 1/2010 |
| JP | 5-173194 | 7/1993 |
| JP | 2004-279999 | 10/2004 |
| JP | 2008-185990 | 8/2008 |

OTHER PUBLICATIONS

Aug. 26, 2009 European search report in connection with a counterpart European patent application No. 09 25 1565.

* cited by examiner

*Primary Examiner*—David N Spector
(74) *Attorney, Agent, or Firm*—Cooper & Dunham LLP

(57) ABSTRACT

An electrophoretic dispersion solution includes a nonpolar solvent and plural kinds of electrophoretic particles. At least one kind of the electrophoretic particles has, on surfaces, a copolymer including a first monomer that has a charged group and a second monomer expressed by a first formula represented as

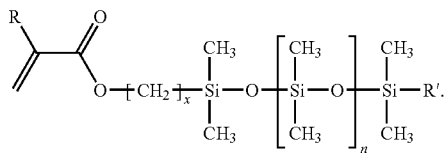

R denotes a hydrogen atom or a methyl group, R' denotes a hydrogen atom or an alkyl group with a carbon number of 1 through 4, n is a natural number, and x denotes an integer of 1 through 3. At least another kind of the electrophoretic particles include, on surfaces, a polymer including a third monomer expressed by a second formula represented

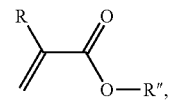

as a component of the polymer. R denotes a hydrogen atom or a methyl group and R'''' denotes an alkyl group with a carbon number of 4 or larger.

7 Claims, 1 Drawing Sheet

ELECTROPHORETIC DISPERSION SOLUTION, IMAGE DISPLAY MEDIUM USING THE SAME, AND IMAGE DISPLAY DEVICE USING THE SAME

BACKGROUND OF THE INVENTION

1. Field of the Invention

The present invention generally relates to an electrophoretic dispersion solution, an image display medium using the electrophoretic dispersion solution, and an image display device using the electrophoretic dispersion solution.

2. Description of the Related Art

Conventionally, CRTs (Cathode Ray Tubes) and liquid crystal displays have been employed for image display devices which display text and images such as static images and moving images. These devices can instantly display and rewrite digital data; however, they are not suitable to be used at all times as portable devices. Moreover, there are many disadvantages in that eyes become fatigued due to a long-time operation and images cannot be displayed when the power is off. Meanwhile, when text and static images are distributed or stored as documents and the like, they are recorded on a paper medium by a printer. This paper medium is widely used as what is called a hard copy. The text and static image on the hard copy can be more easily read with less fatigue in a free posture. Further, the lightweight hard copy provides superior portability. However, when a hard copy discarded after use is recycled, the recycling requires considerable labor and cost. Therefore, there remains a problem in view of resource savings.

A paper-like rewritable display medium with advantages of both the display device and the hard copy has been in high demand. Display mediums employing high molecular dispersive type liquid crystals, bistable cholesteric liquid crystals, electrochromic elements, electrophoretic elements, or the like have been attracting attention as a reflective type display medium capable of bright display. Among these, a display medium employing electrophoretic elements is superior in display quality and reduced power consumption of a display operation. For example, Patent Documents 1, 2, and the like disclose such display media. A display medium employing the electrophoretic elements includes a dispersion solution filling in between a pair of transparent electrodes. The dispersion solution includes a colored dispersion medium in which plural electrophoretic particles having a different color than the dispersion medium are dispersed. In this case, the electrophoretic particles have charges on the surfaces in the dispersion medium. When a voltage of an opposite polarity (direction) to the charge of the electrophoretic particles is applied to one of the transparent electrodes, the electrophoretic particles are attracted to the transparent electrode to which the voltage is applied. As a result, the color of the electrophoretic particles can be observed from the transparent electrode side. When a voltage with the same polarity (direction) as the charge of the electrophoretic particles is applied to one of the transparent electrodes, the electrophoretic particles move toward transparent electrode opposite to the one to which the same potential is applied. As a result, the color of the dispersion medium is observed at the transparent electrode side to which the voltage is applied. By utilizing the changes of colors responsive to the voltage change, images can be displayed.

As described above, the paper-like display medium is required to have bistability in addition to viewability and portability. According to Patent Document 3, by using polyisobutylene with a viscosity-average molecular weight of about 4000000 through 1200000, which is dissolved or dispersed in a nonpolar solvent, aggregation is realized by what is called a depletion effect, and the bistability is enhanced.

[Patent Document 1] Japanese Patent No. 2612472

[Patent Document 2] Japanese Patent Application Publication No. 5-173194

[Patent Document 3] U.S. Patent Application Publication No. 2002-0180687

As disclosed in Patent Document 3, when a polymer is dissolved in a dispersion medium to enhance the bistability, viscosity of the dispersion medium is increased. According to the Huckel formula (formula 1 below), electrophoretic mobility and viscosity of a dispersion medium are inversely proportional to each other. That is, when the viscosity of the dispersion medium is increased, the electrophoretic mobility is decreased.

$$\mu = \frac{2\varepsilon_0\varepsilon_r\zeta}{3\eta} \qquad \text{[Formula 1]}$$

(Here, $\mu$ indicates electrophoretic mobility, $\varepsilon_o$ denotes a dielectric constant in vacuum, $\varepsilon_r$ denotes a relative dielectric constant of the dispersion medium, $\zeta$ indicates a zeta potential of the electrophoretic particles, and $\eta$ indicates a viscosity of the dispersion medium.)

When a polymer is dissolved in a dispersion medium, the viscosity of the dispersion medium is increased and bistability is enhanced. On the other hand, the electrophoretic mobility is decreased, which leads to a delay of an operation, an increase of a driving voltage, and the like of the electrophoretic display medium. That is, in the case where the Huckel formula is established, it becomes very difficult to improve the bistability without increasing the viscosity of the dispersion medium.

It is an object of at least one embodiment of the present invention to provide an electrophoretic dispersion solution having bistability whereby stable electrophoretic mobility and a stable static state can be realized, and to provide an image display medium and an image display device using this electrophoretic dispersion solution.

To realize an electrophoretic dispersion solution having a stable electrophoretic mobility, electrophoretic particles are required to be favorably dispersed. To obtain a favorable dispersed state in a particle dispersed system, a VAN-DER-Waals force (attraction force) and an electrostatic repulsive force (repulsive force), which act between the particles, are required to be controlled, according to DLVO (Derjaguin and Landau, Verwey and Overbeek) logic. In particular, it is generally known that non-DLVO mutual effects strongly act in a nonpolar solvent system. Among the effects, a component related to a polymer repulsive force (repulsive force) is known to be particularly superior. That is, a stable electrophoretic state of the electrophoretic particles in the nonpolar solvent in the particle dispersed system is realized by covering or wrapping (incorporating) surfaces of the electrophoretic particles with a substance with an affinity for the dispersion medium, and forming polymers with an appropriate density and polymerization on the surfaces of the electrophoretic particles.

Moreover, to realize a stable static state, the electrophoretic particles are required to be aggregated. Among plural kinds of electrophoretic particles, one kind with the smallest extinction coefficient in a visible region has little effect on an optical change of image display. Therefore, such a kind of electrophoretic particles does not have to be aggregated to achieve a stable static state.

When an electrophoretic dispersion solution includes n kinds of electrophoretic particles, at least (n−1) kinds of electrophoretic particles are required to be aggregated. The electrophoretic particles may be aggregated between the same kinds of particles or aggregated by becoming attached to a wall surface included as a component of the electrophoretic medium. To obtain a stable aggregated state of the electrophoretic particles, an opposite process to that for forming the dispersed state is to be performed. By a process to remove the polymers on the surfaces of the particles, an attraction force becomes too strong and makes it difficult to form the dispersed state of the electrophoretic particles. Thus, a stable electrophoretic state cannot be obtained.

To obtain an aggregated state of the electrophoretic particles by taking the bistability in consideration, it is effective to form, on surfaces of the electrophoretic particles, polymers including a monomer having a charged group to control a charge property of the electrophoretic particles. Further, in the case where there is a strong mutual effect between different kinds of electrophoretic particles in the electrophoretic dispersion solution including plural kinds of electrophoretic particles, it becomes difficult to cause independent electrophoresis of each of the different kinds of electrophoretic particles. Thus, it becomes difficult for the electrophoretic particles to be eccentrically present in the electrophoretic medium. That is, independent electrophoretic states and independent aggregated states of the different kinds of particles cannot be obtained. For example, one kind of electrophoretic particles disturbs the aggregated state of the other kind of electrophoretic particles. In this case, a stable bistability cannot be obtained. To avoid such a situation, the surfaces of the electrophoretic particles are required to be modified or covered with (incorporated) a substance that is designed to have an appropriate mutual effect between the different kinds of particles and between the particles and the wall surface.

As a result of keen examination of an optimal electrophoretic dispersion solution based on the above description, the present inventors selected a monomer having a charged group and a monomer having a siloxane structure expressed by general formula 1 below as a substance having an affinity for a nonpolar solvent. The inventors found an electrophoretic solution including electrophoretic particles of which surfaces are modified or wrapped with a copolymer including at least these monomers and electrophoretic particles of which surfaces are modified or wrapped with a polymer including at least a monomer expressed by general formula 2 below as a monomer with an affinity for the nonpolar solvent.

[General formula 1]

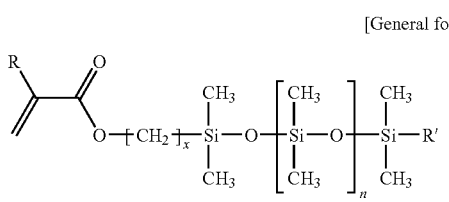

In general formula 1, R denotes a hydrogen atom or a methyl group, R' denotes a hydrogen atom or an alkyl group with a carbon number of 1 through 4, n denotes a natural number, and x denotes an integer of 1 through 3.

[General formula 2]

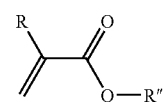

In general formula 2, R denotes a hydrogen atom or a methyl group, and R" denotes an alkyl group with a carbon number of 4 or larger. In particular, the monomer having the charged group is preferably a monomer expressed by general formula 3 or 4.

[General formula 3]

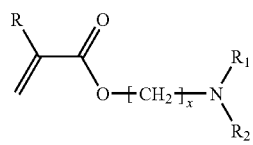

In general formula 3, R, $R_1$, and $R_2$ independently denote a hydrogen atom or a methyl group, and x denotes an integer of 1 through 3.

[General formula 4]

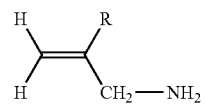

In general formula 4, R denotes a hydrogen atom or a methyl group.

By using the above-described electrophoretic solution, bistability can be obtained, whereby a stable electrophoretic state and a stable static state can be realized. When the electrophoretic solution provided in the present invention is used for an image display medium that utilizes an electrophoretic phenomenon, images can be easily displayed in response to a voltage and superior memory can be provided.

SUMMARY OF THE INVENTION

According to one aspect of the present invention, an electrophoretic dispersion solution includes a nonpolar solvent and plural kinds of electrophoretic particles. At least one kind of the electrophoretic particles has, on surfaces, a copolymer including a first monomer that has a charged group and a second monomer expressed by a first formula represented as

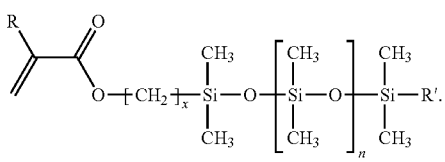

R denotes a hydrogen atom or a methyl group, R' denotes a hydrogen atom or an alkyl group with a carbon number of 1 through 4, n is a natural number, and x denotes an integer of 1 through 3. At least another kind of the electrophoretic particles include, on surfaces, a polymer including a third monomer expressed by a second formula represented as

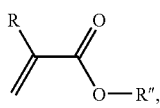

as a component of the polymer. R denotes a hydrogen atom or a methyl group and R" denotes an alkyl group with a carbon number of 4 or larger.

According to another aspect of the present invention, an image display device includes an image display medium including a pair of electrodes. One of the electrodes is capable of transmitting light. The image display device further includes an electrophoretic dispersion solution between the electrodes. The electrophoretic dispersion solution includes a nonpolar solvent and plural kinds of electrophoretic particles. At least one kind of the electrophoretic particles has, on surfaces, a copolymer including a first monomer that has a charged group and a second monomer expressed by a first formula represented as

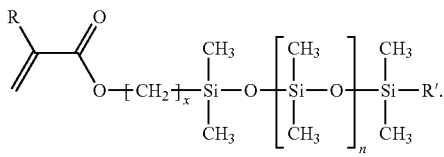

R denotes a hydrogen atom or a methyl group, R' denotes a hydrogen atom or an alkyl group with a carbon number of 1 through 4, n is a natural number, and x denotes an integer of 1 through 3. At least another kind of the electrophoretic particles includes, on surfaces, a polymer including a third monomer expressed by a second formula represented as

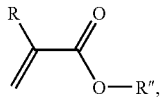

as a component of the polymer. R denotes a hydrogen atom or a methyl group and R" denotes an alkyl group with a carbon number of 4 or larger. The electrophoretic dispersion solution is divided into plural micro spaces defined by one or more partitions. The image display device further includes a control part configured to control a display of the image display medium.

DETAILED DESCRIPTION OF THE PREFERRED EMBODIMENTS

Figure 1:
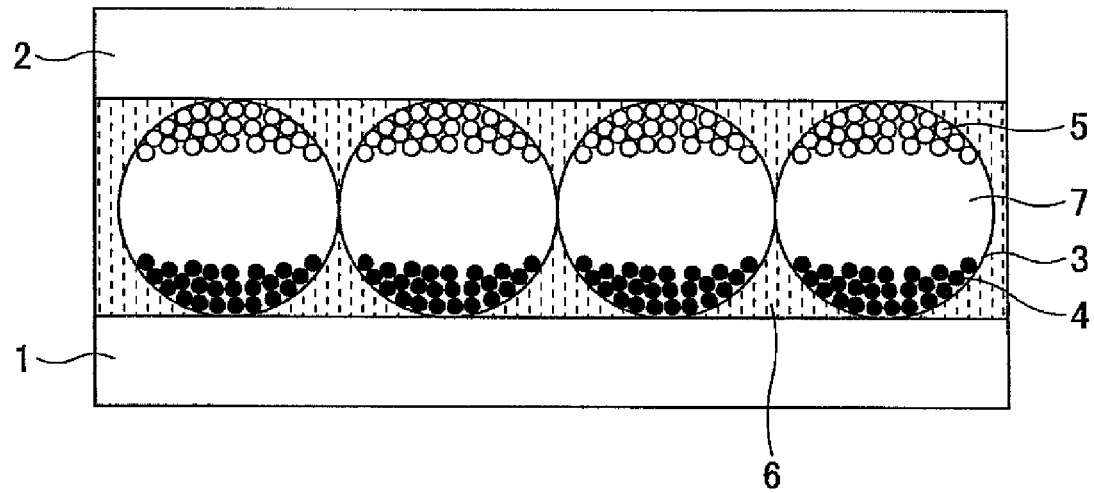
FIG. 1 is a configuration example of an image display medium of an embodiment of the present invention.

Embodiments of the present invention are described below with reference to the drawings as required. The description below corresponds to examples of preferred embodiments of the present invention and the present invention is not limited to these embodiments.

First Embodiment

An electrophoretic dispersion solution according to a first embodiment of the present invention includes a nonpolar solvent and plural kinds of electrophoretic particles. Surfaces of at least one kind of the electrophoretic particles have copolymers including monomers with a charged group and monomers expressed by general formula 1.

Surfaces of at least another kind of the electrophoretic particles chemically have polymers including monomers expressed by general formula 2.

The nonpolar solvent is preferably a nonpolar organic solvent. As the nonpolar organic solvent, paraffinic hydrocarbon such as pentane, hexane, heptane, octane, nonane, decane, and dodecane; an isoparaffinic hydrocarbon such as isohexane, isooctane, and isododecane; an alkylnaphthenic hydrocarbon such as liquid paraffin; an aromatic hydrocarbon such as benzene, toluene, xylene, alkylbenzene, and solvent naphtha; a silicone oil such as dimethyl silicone oil, phenyl methyl silicone oil, dialkyl silicone oil, alkyl phenyl silicone oil, cyclic polydialkyl siloxane, and cyclic polyalkyl phenyl siloxane; or a mixture of these can be used.

As the monomer having the charged group, a monomer having an ionic polar group can be used. As polar groups that can be positively charged, an amino group is well known. As a polar group that can be negatively charged, a carboxyl group, a sulfo group, a phospho group, and the like are well known.

For example, as specific examples of the monomer having the polar group that can be negatively charged, there are (meth)acrylic acid, maleic acid, maleic anhydride, itaconic acid, itaconic acid anhydride, fumaric acid, cinnamic acid, crotonic acid, vinylbenzoic acid, 2-methacryloxyethyl succinic acid, 2-methacryloxyethyl maleic acid, 2-methacryloxyethyl hexahydrophthalate, vinylsulfonic acid, arylsulfonic acid, styrene sulfonic acid, 2-sulfoethyl methacrylate, 2-acrylamide-2-methyl propane sulfonic acid, 3-chloroamide phosphoxy propyl methacrylate, 2-methacryloxyethylacid phosphate, and the like.

As specific examples of the monomer having the polar group that can be positively charged, there are N-methylaminoethyl(meth)acrylate, N-ethylaminoethyl(meth)acrylate, N,N-dimethylaminoethyl(meth)acrylate, N,N-diethylaminoethyl(meth)acrylate, N,N-dibutylaminoethyl acrylate, N,N-di-tert-butylaminoethyl acrylate, N-phenylaminoethyl methacrylate, N,N-diphenylaminoethyl methacrylate, dimethylamino styrene, N-methylaminoethyl styrene, dimethylaminoetoxy styrene, diphenylaminoethyl styrene, N-phenylaminoethyl styrene, 2-N-piperidyl(meth)acrylate, 2-vinylpyridine, 4-vinylpyridine, 2-vinyl-6-methylpyridine, and the like.

A polysiloxane moiety of the silicone macromer expressed in general formula 1 has a superior affinity for a dispersion medium that can be favorably used as an electrophoretic image display medium, such as a nonpolar organic solvent which is in particular an aliphatic hydrocarbon and silicone oil. Particularly, a polymer of macromers having a vinyl group at one end has a comb type structure in which plural side chains are coupled to a main chain. When the comb type structure part has compatibility with a solvent, a large steric effect is provided to the polymer having this monomer as a component, which has favorable dispersion stability with respect to the dispersion medium. In general formula 1, R denotes a hydrogen atom or a methyl group, R' denotes a hydrogen atom or an alkyl group with a carbon number of 1 through 4, and x denotes an integer of 1 through 3. In general formula 1, n denotes a natural number which is preferably 3 through 600 normally and more preferably 10 through 200. When these elements are expressed as an average molecular weight of the silicone macromer expressed in general formula 1, the average molecular weight is about 500 through 50000. For example, silicone macromers with the average molecular weight of 1000, 5000, and 10000, which are obtained when x=3, are actually sold as products that can be favorably used.

An alkyl moiety R" of the monomer expressed in general formula 2 has superior affinity for a dispersion medium which is favorably used for the electrophoretic image display medium, such as a nonpolar solvent that is in particular aliphatic hydrocarbon and silicone oil. In particular, a polymer formed of monomers having a vinyl group at one end has a comb type structure in which plural side chains are coupled to a main chain. When this comb structure part has compatibility with the solvent, the polymer having this monomer as a component is provided with a large steric effect and thus has favorable dispersion stability. Moreover, the alkyl group which basically does not have a charged group does not have an electrostatic mutual effect. Further, by chemically coupling the alkyl groups, a pigment surface-derived charged group of the electrophoretic particles can be made inert by the chemical reaction. Thus, an effect on a different kind of particle can be suppressed. The carbon number of the alkyl moiety R" of general formula 2 is not limited as long as it is 4 or larger. Normally, monomers with a carbon number of 4 through 18 are sold as products, which can be favorably used.

A microparticle core of the electrophoretic particle of the present invention, which is used as a core to have the polymer or co-polymer on the surface, may be a particle formed of any material, such as a polymer particle, a metal particle, a metal oxide particle, an inorganic particle, a carbon particle, and a pigment particle. Normally, a microparticle core having a color itself, or a microparticle colored by a colorant such as a pigment may be used. When a carbon particle, metal oxide, ceramics, and the like are used as the microparticle core, the quality of its surface can be easily changed by using a coupling agent. Further, since the carbon particle, the metal oxide, the ceramics, and the like have a large light absorbing effect and light scattering effect, it is effective to use such microparticle cores for a display device to improve the contrast of an image. As specific examples of a metal oxide used in the present invention, titanium oxide, zinc oxide, aluminum oxide, and the like are suggested. In addition, an arbitrary microparticle core can be used though a microparticle core which can be treated by a coupling agent is preferable. As examples of such a microparticle core, metal sulfide and the like can be suggested.

As an example of a white particle used as a microparticle core, a solid particle of a metal oxide such as silicon dioxide, aluminum oxide, and titanium oxide can be used. As an example of a black particle used as the microparticle core, carbon black, aniline black, furnace black, lamp black, and the like can be used.

As a colored particle of cyan to be used as the microparticle core, for example, phthalocyanine blue, methylene blue, Victoria blue, methyl violet, aniline blue, ultramarine blue, and the like can be used. As a colored particle of magenta to be used as the microparticle core, for example, rhodamine 6G lake, dimethyl quinacridon, watching red, rose Bengal, rhodamine B, alizarin lake, and the like can be used. As a colored particle of yellow to be used as the microparticle core, for example, chrome yellow, benzidine yellow, Hansa yellow, naphthol yellow, molybdenum orange, quinoline yellow, tartrazine, and the like can be used.

The microparticles such as the white particles, black particles, or colored particles may be dispersed or mixed in at least a binder resin, which is insoluble in a solvent to be used as an electrophoretic dispersion medium, to be used. As the binder resin, known thermoplastic resins and thermosetting resins which are insoluble in the dispersion medium can be used. In particular, an incoherent material-based material is preferably used. As examples of such a resin, there are styrene such as a polyester resin, polystyrene, poly-p-chlorostyrene, and polyvinyl toluene, and a homopolymer of their substituents, and the like. The microparticles such as the white particles, black particles, or colored particles can be used at 0.1 to 300 parts by mass or preferably 1 to 100 parts by mass with respect to 100 parts by mass of the binder resin.

Second Embodiment

In an electrophoretic dispersion solution according to a second embodiment of the present invention, the monomers having the charged group include a monomer expressed by general formula 3.

The monomer expressed by general formula 3 is basic since it includes an amino group. That is, the monomer has an ionic property as a cation. Thus, a polymer including this monomer as a component can exhibit a positive charge. Depending on a mutual effect with a different kind of particle or a wall surface, this monomer can be selected. In general formula 3, R, $R_1$, and $R_2$ independently denote a hydrogen atom or a methyl group, while x denotes an integer of 1 through 3.

Third Embodiment

In an electrophoretic dispersion solution according to a third embodiment of the present invention, the monomers having the charged group include a monomer expressed by general formula 4. The monomer expressed by general formula 4, which is a primary amine in which a hydrogen atom of a terminal amino group is not substituted by an alkyl group, is strongly basic. That is, the monomer has high ionic strength as a cation. Therefore, a polymer including this monomer as a component can exhibit a strong positive charge. Depending on a mutual effect with a different kind of particle or a wall surface, this monomer can be selected. In general formula 4, R denotes a hydrogen atom or a methyl group.

Fourth Embodiment

An electrophoretic dispersion solution according to a fourth embodiment of the present invention can include a dispersion agent. This dispersion agent prevents electrophoretic particles from being aggregated in a dispersion medium and maintains a stable dispersion of the electrophoretic particles. Such a dispersion agent has an affinity for both a dispersion medium and the electrophoretic particles. As the dispersion agent, what are called a cationic system surfactant, an anionic system surfactant, a nonionic system surfactant, and an amphoteric surfactant can be widely used. Such dispersion agents function as follows: a hydrophilic group part attaches to polar group parts of surfaces of the electrophoretic particles, and the electrophoretic particles mutually repulse each other due to a steric effect of a hydrophobic group.

Further, the cationic system surfactant and anionic system surfactant are known to function as charge controlling agents and thus can be used for controlling a charge.

A ratio of content of the dispersion agent is 0.1 to 40 mass % or preferably 10 to 20 mass % with respect to the electrophoretic particle dispersion solution.

In the present invention, when electrophoretic particles include a basic group such as an amino group, it is preferable to use a dispersion agent having an acid group. At this time, charging characteristics can be further improved depending on ion generation between the basic group on the surface of the electrophoretic particles and the acid group of the dispersion agent attached onto the electrophoretic particles. As specific examples of such dispersion agents, a surfactant such as long-chain carboxylic acid and dodecylbenzene sulfonic acid is suggested.

As a dispersive agent having an acid group, a polymer compound is preferably used. A polymer compound having an acid group can improve dispersion stability of the dispersed electrophoretic particles by a steric effect of a polymer chain. The polymer compound having an acid group is preferably formed by copolymerizing a monomer having a high affinity for a nonpolar solvent, a monomer having an acid group, and a monomer having a polar group if required, and the like.

The monomers that can be polymerized are described below. First, as examples of the monomers having a high affinity for the nonpolar solvent, there are 2-ethylhexyl(meth)acrylate, octyl(meth)acrylate, nonyl(meth)acrylate, decyl(meth)acrylate, lauryl(meth)acrylate, stearyl(meth)acrylate, vinyl laurate, lauryl methacryl amide, stearyl metacryl amide, methoxyethyl(meth)acrylate, ethoxyethyl(meth)acrylate, butoxyethyl(meth)acrylate, methyl(meth)acrylate, ethyl(meth)acrylate, butyl(meth)acrylate, hexyl(meth)acrylate, cyclohexyl(meth)acrylate, benzyl(meth)acrylate, phenyl(meth)acrylate, styrene, vinyl toluene, vinyl acetate, and the like.

Further, a silicone dispersion agent formed by grafting polysiloxane to a side chain propyl group of poly(meth)acrylic acid propyl has a high affinity for silicone oil and can provide a stable dispersion solution.

As examples of monomers having an acid group, there are monomers having at least one anionic group such as a —COOH group, a —SO$_3$H group, a —SO$_2$H group, a —CH$_2$NO$_2$ group, a —CHRNO$_2$ group, a —ArOH group, and a —ArSH group (R denotes an alkyl group and Ar denotes an aryl group) in addition to a vinyl group. To be specific, there are (meth)acrylic acid, maleic acid, maleic acid anhydride, itaconic acid, itaconic acid anhydride, fumaric acid, cinnamic acid, crotonic acid, vinyl benzoin acid, 2-methacryloxyethyl succinic acid, 2-methacryloxyethyl maleic acid, 2-methacryloxyethyl hexahydrophthalic acid, vinyl sulfonic acid, aryl sulfonic acid, styrene sulfonic acid, 2-sulfoethyl methacrylate, 2-acrylamide-2-methylpropane sulfonic acid, 3-chloroamide phosphoxypropyl methacrylate, 2-methacryloxyethyl acid phosphate, and the like.

As examples of monomers having a polar group, there are 2-hydroxyethyl(meth)acrylate, 2,3-dihydroxypropyl(meth)acrylate, 4-hydroxybutyl(meth)acrylate, 2-hydroxy-3-propylmethacrylate, 2-chloroethyl(meth)acrylate, 2,3-dibromopropyl(meth)acrylate, (meth)acrylonitrile, isobutyl-2-cyanoacrylate, 2-cyanoethyl acrylate, ethyl-2-cyanoacrylate, methacryl acetone, vinyl pyrrolidone, N-acryloyl morpholine, tetrahydrofurfuryl methacrylate, trifluoroethyl methacrylate, p-nitrostyrene, acrylamide, methacryl amide, N,N-dimethylmethacryl amide, N,N-dibutylmethacryl amide, and the like.

An average molecular weight of the polymer compound used as a dispersion agent in the present invention may be 1000 through 100000 or preferably 2000 through 50000.

Fifth Embodiment

An image display medium according to a fifth embodiment of the present is described with reference to FIG. 1. In FIG. 1, reference numerals 4 and 5 denote white or colored electrophoretic particles. For example, colored electrophoretic particles 4 and white electrophoretic particles 5 are provided, of which colors and charge polarities are different from each other (in this embodiment, black electrophoretic particles are treated as the colored electrophoretic particles). That is, when one of the two kinds of electrophoretic particles, that is the white electrophoretic particles include, on the surface, a copolymer having a monomer expressed by general formula 1 and a monomer having a charged group, the other kind of electrophoretic particles, that is the colored electrophoretic particles include a polymer having a monomer expressed by general formula 2 as a polymer component.

The microcapsules 3 are filled with the colored electrophoretic particles 4 and the white electrophoretic particles 5 along with a dispersion medium 7. The microcapsules 3 function as partition walls. A dispersion solution including a dispersion medium 7, the colored electrophoretic particles 4, and the white electrophoretic particles 5, which fills in each microcapsule 3, corresponds to the electrophoretic dispersion solution of the embodiments of the present invention. The dispersion medium 7 is a nonpolar solvent, which is preferably transparent in order to increase the contrast of an image, which is based on the difference in colors of the colored electrophoretic particles 4 and the white electrophoretic particles 5. In the dispersion medium 7, a dispersion agent and the like may be added to control the dispersion of the dispersed electrophoretic particles as required. The partition walls may be directly formed on an electrode by lithography and the like, instead of using the microcapsules 3.

As an example of the white electrophoretic particles 5 included in the electrophoretic particle dispersion solution, there are electrophoretic particles having the white particles as cores and the polymer or copolymer on the surface of the cores. As an example of the colored electrophoretic particles 4, there are electrophoretic particles having the black particles and colored particles as cores and the polymer or copolymer on the surface of the cores.

In FIG. 1, reference numerals 1 and 2 denote electrodes, at least one of which has a light transmitting property. As the electrodes 1 and 2, the materials described above can be used. When a power source contacts a part of the electrodes 1 and 2, an electric field can be generated between the electrodes 1 and 2. As a result, the colored electrophoretic particles 4 and the white electrophoretic particles 5 can reliably and independently move in respective predetermined directions according to the generated electric field. Displaying an image is easy since a voltage applying unit to apply a voltage between the electrodes 1 and 2 is to be provided. When a thin film transistor (TFT) or the like is used as one of the electrodes 1 and 2 to control an applied voltage per microcapsules 3 or per certain sections, each of the micro capsules 3 or the certain sections can be used as a pixel.

The image display medium of this embodiment is manufactured by mixing the microcapsules including the electrophoretic particle dispersion solution, which are described above, and a transparent and colorless adhesive which is to serve as an adhesive support layer 6 to obtain a mixture; applying the mixture onto an electrode substrate; and bonding a counter electrode substrate to the electrode substrate. The mixture can be applied by a known film applying method such as using a blade, a wire bar, dipping, and spin coating. However, a method to apply the mixture on the electrode substrate is not particularly limited. The image display medium can be easily manufactured through these steps.

Sixth Embodiment

Figure 2:
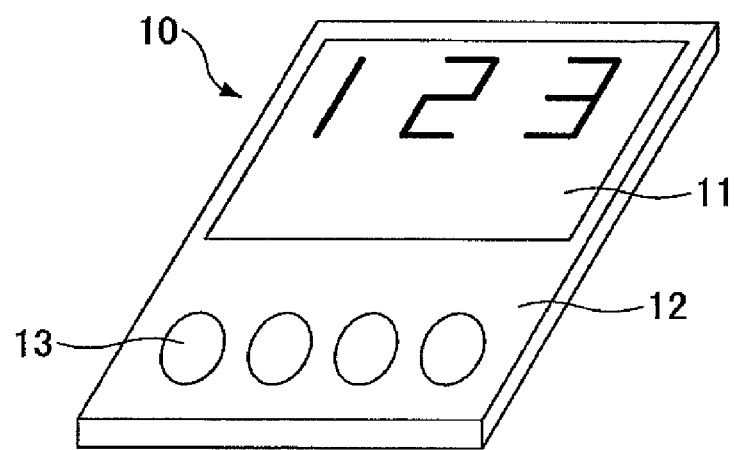
FIG. 2 is an example of an image display device of an embodiment of the present invention.

An image display device according to a sixth embodiment of the present invention is described with reference to FIG. 2. As shown in FIG. 2, an image display device 10 of the present invention includes an image display part 11 formed of an image display medium of the present invention, and a control part 12 including a driving circuit to control the image display part 11, an arithmetic circuit, an internal memory, a power source, and the like. Electrodes of the image display medium (image display part 11) form a dot matrix. An image is displayed as a whole when specified dots of the dot matrix are turned on. In FIG. 2, a reference numeral 13 denotes an information input unit through which information required for the control part is inputted.

EXAMPLE 1

[Manufacture of White Electrophoretic Particle A]

In a reaction vessel provided with an agitator, 93 parts by mass of ethanol and 7 parts by mass of water were mixed to obtain a mixed solvent, which was then controlled in pH to be 4.5 by using glacial acetic acid. Then, 16 parts by mass of 3-(trimethoxysilyl)propyl methacrylate were dissolved and 100 parts by mass of titanium oxide were added into the mixed solvent and agitated for 10 minutes. Subsequently, 180 parts by mass of ethanol were added to the mixed solvent and agitated. Solid matter obtained by centrifugal separation of the mixed solvent was left for a whole day and night and then vacuum-dried at 70° C. for four hours to obtain surface treatment titanium oxide. In another reaction vessel provided with an agitator, a thermometer, and a reflux condenser, 70 parts by mass of toluene were prepared and 50 parts by mass of lauryl methacrylate were dissolved therein. Here, 25 parts by mass of toluene in which 40 parts by mass of the surface treatment titanium oxide and 0.3 parts by mass of azobisisobutyronitrile were dissolved were added into the reaction vessel and agitated at 70° C. for seven hours in a nitrogen atmosphere. After the reaction, centrifugal separation and toluene cleaning were repeated to obtain a solid matter through separation and refinement. At last, vacuum drying was performed at 70° C. for four hours, and thereby the white electrophoretic particles A were obtained.

[Manufacture of Black Electrophoretic Particles A]

In a reaction vessel provided with an agitator, a thermometer, and a reflux condenser, 1 part by mass of a dispersion agent, 1.5 parts by mass of carbon black, and 200 parts by mass of silicone oil were mixed and irradiated with ultrasonic waves by a homogenizer for one hour while being cooled by ice, and thereby the carbon black was dispersed. Into this mixture, 6 parts by mass of methyl methacrylate, 3 parts by mass of methacryloxypropyl modified silicone (manufactured by Chisso Corporation, SILAPLANE FM-0725; in general formula (I), x=3 and a molecular weight is about 10000), 0.1 part by mass of N,N-dimethylamino propylacrylamide, and 0.05 parts by mass of azobis dimethylvaleronitrile were added and reacted at 60° C. for six hours. After the reaction, only solid matter was collected and dried; thereby the desired black electrophoretic particles A were manufactured.

[Preparation of Electrophoretic Dispersion Solution A]

In 20 parts by mass of an isoparaffin system hydrocarbon solvent (manufactured by Exxon Chemical Company: IsoparG), 15 parts by mass of the white electrophoretic particles A, 0.7 parts by mass of the black electrophoretic particles A, and 0.18 parts by mass of an oil-soluble surfactant (manufactured by Lubrizol Corporation: Solsperse17000) were added and dispersed by ultrasonic waves; thereby the electrophoretic dispersion solution A was prepared.

[Manufacture of Electrophoretic Dispersion Solution-Contained Microcapsule Slurry A]

Inclusion of the electrophoretic dispersion solution in microcapsules was performed by using a gelatin-acacia gum system which is the most commonly used and actively researched in a complex coacervation method. In a reaction vessel provided with an agitator and a thermometer, 130 parts by mass of gelatin aqueous at 2.5 mass % were prepared and heated at 40° C. Then, 45 parts by mass of the electrophoretic dispersion solution A were put in the reaction vessel and agitated for 10 minutes to be emulsified. Then, 32.5 parts by mass of an acacia gum aqueous at 10 mass % which had been heated at 40° C. was put in the reaction vessel and agitated for 10 minutes. After that, a solution of acetate at 10 mass % was dropped in drops into the reaction vessel, pH of the mixture was controlled to be 4, and the mixture was further agitated for 10 minutes. Then, the mixture was cooled down to 5° C. at a speed of 1° C./minute, and agitated at 5° C. for 20 minutes. Then, 1.7 parts by mass of a glutaraldehyde solution at 25 mass % was put in the reaction vessel and further agitated for 30 minutes. After that, a sodium hydroxide aqueous at 10 mass % was dropped in drops into the reaction vessel, pH of the mixture was controlled to be 9, and the mixture was further agitated for 30 minutes. After that, the mixture was heated to be 40° C. at a speed of 1° C./minute and agitated at 40° C. for 120 minutes. Then, the mixture was cooled down to room temperature and agitated for one night; thereby microcapsules including the electrophoretic dispersion solution were manufactured. Then, the microcapsules were sufficiently cleaned with ion exchanged water. As a result, microcapsule slurry A of which capsule diameter was mainly about 40 μm was obtained through classification using a sieve. This slurry was used to manufacture an electrophoretic display medium.

[Manufacture and Operation of Image Display Medium A]

An image display medium was manufactured by using a co-electrodeposition method disclosed in Japanese Patent Application Publication No. 2004-279999. The microcapsule slurry A was left at rest for one night. One part by mass of the microcapsule slurry A which has been precipitated and thickened and 3 parts by mass of electrodeposition liquid (urethane dispersion: SF150 manufactured by Dai-ichi Kogyo Seiyaku Co., Ltd.) which had been controlled at an appropriate concentration were mixed and agitated to obtain a mixture. This mixture was supplied to fill in between a substrate having an ITO transparent electrode and a counter metal electrode, and a voltage at 10 V was applied between the electrodes for 10 seconds. Then, the substrate having the ITO transparent electrode was cleaned with ion exchanged water and dried at 80° C. for 30 minutes in an oven; thereby a microcapsule array was formed on the ITO transparent electrode. The capsule array was coated with urethane dispersion (manufactured by DMS: NeoRez9617), which had been controlled at an appropriate concentration, by dip coating, and dried at 80° C. for 30 minutes in an oven. Then, the substrate having the microcapsule array was attached to a glass having an ITO transparent electrode and underwent a laminating process with conditions of 100° C., 0.4 m/minute, and 1 MPa; thereby the image display medium A was manufactured.

The image display device A manufactured as described above was operated. When a voltage of +15 V was applied to a top ITO electrode, the white electrophoretic particles A were quickly electrodeposited to the top electrode side while the black electrophoretic particles A were quickly electrodeposited to a bottom electrode side. When seen from a top substrate surface, a white color was observed. Next, when a voltage of −15 V was applied to the top ITO electrode, the black electrophoretic particles A were quickly electrodeposited to the top electrode side while the white electrophoretic particles A were quickly electrodeposited to the bottom electrode side. When seen from the top substrate surface, a black color was observed. Further, light reflectivity of the white display (a rate of a reflected light amount with respect to a white incident light amount) was 45%. When this white display state was maintained one day without applying a voltage, the light reflectivity hardly changed.

EXAMPLE 2

[Manufacture of Black Electrophoretic Particle B]

In a reaction vessel provided with an agitator, a thermometer, and a reflux condenser, one part by mass of the dispersion agent, 1.5 parts by mass of carbon black, and 200 parts by mass of silicone oil were mixed and irradiated with ultrasonic waves by a homogenizer for one hour while being cooled by ice; thereby the carbon black was dispersed. In this mixture, 6 parts by mass of methyl methacrylate, 3 parts by mass of methacryloxypropyl modified silicone (manufactured by Chisso Corporation, SILAPLANE FM-0725; in general formula 1, x=3 and a molecular weight is about 10000), 0.1 part by mass of allylamine, and 0.05 parts by mass of azobis dimethylvaleronitrile were added and reacted at 60° C. for six hours. After the reaction, only solid matter was collected and dried, and thereby the black electrophoretic particles B were manufactured.

[Manufacture and Operation of Black Electrophoretic Particles B]

Except that the black electrophoretic particles B were used instead of the black electrophoretic particles A of example 1, an image display medium was manufactured in a manner similar to example 1. When a voltage of +5 V was applied to the top ITO electrode, the white electrophoretic particles A were quickly electrodeposited to the top electrode side while the black electrophoretic particles B were quickly electrodeposited to the bottom electrode side. When seen from the top substrate surface, a white color was observed. Next, when a voltage of −5 V was applied to the top electrode, the black electrophoretic particles B were quickly electrodeposited to the top electrode side while the white electrophoretic particles A were quickly electrodeposited to the bottom electrode side. When seen from the top substrate surface, a black color was observed. Further, light reflectivity of the white display (a rate of a reflected light amount with respect to white incident light amount) was 45%. When this white display state was maintained one day without applying a voltage, the light reflectivity hardly changed.

COMPARISON EXAMPLE 1

[Manufacture of Black Electrophoretic Particles C]

In a reaction vessel provided with an agitator, a thermometer, and a reflux condenser, 450 parts by mass of ion exchanged water were prepared, to which 25 parts by mass of carbon black and 0.7 parts by mass of hydrochloric acid at 37% were added. In this mixture, 0.6 parts by mass of 4-vinyl aniline were added and agitated with heat at 65° C., and then 3.2 parts by mass of a sodium nitrite aqueous at 10% were dropped in drops into the mixture. Further, the mixture was agitated with heat for three hours; and thereby the reaction was finished. Solid matter of the mixture was cleaned with ion exchanged water by repeating centrifugal separation. At last, the solid matter underwent vacuum drying at 40° C. for four hours, and thereby surface treatment carbon black was obtained. In another reaction vessel provided with an agitator, a thermometer, and a reflux condenser, 50 parts by mass of toluene and 50 parts by mass of 2-ethylhexyl methacrylate were prepared. In this reaction vessel, 25 parts by mass of surface treatment carbon black and 0.33 parts by mass of azobisisobutyronitrile were added and agitated in a nitrogen atmosphere at 70° C. for six hours. After the reaction, the mixture was cooled and 500 parts by mass of tetrahydrofuran were added and agitated. The mixture was then put in 3000 parts by mass of methanol to precipitate solid matter. The solid matter obtained through filtering was cleaned with tetrahydrofuran. At last, the solid matter underwent vacuum drying at 70° C. for four hours, and thereby the black electrophoretic particles C were obtained.

[Manufacture and Operation of Image Display Medium C]

Except that the black electrophoretic particles C were used instead of the black electrophoretic particles A of example 1, an image display medium C was manufactured in a manner similar to example 1. When a voltage of +5 V was applied to the top ITO electrode, the white electrophoretic particles A were quickly electrodeposited to the top electrode side while the black electrophoretic particles C were quickly electrodeposited to the bottom electrode side. When seen from the top substrate side, a white color was observed. Next, when a voltage of −5 V was applied to the top ITO electrode, the black electrophoretic particles C were quickly electrodeposited to the top electrode side while the white electrophoretic particles A were quickly electrodeposited to the bottom electrode side. When seen from the top substrate surface, a black color was observed. Further, light reflectivity of the white display (a rate of a reflected light amount with respect to white incident light amount) was 45%. When this white display state was maintained one day without applying a voltage, the light reflectivity decreased to 15% in about 10 seconds.

COMPARISON EXAMPLE 2

[Manufacture of White Electrophoretic Particles D]

25 parts by mass of titanium oxide and 75 parts by mass of a styrene resin which had been heated and dissolved were mixed and evenly dispersed by using a roll mill. Then, the mixture was cooled, cured, and pulverized to obtain the white electrophoretic particles D.

[Manufacture and Operation of Image Display Medium D]

Except that the white electrophoretic particles D were used instead of the white electrophoretic particles A of example 1, an image display medium D was manufactured in a manner similar to example 1. When a voltage of +20 V was applied to the top ITO electrode, the white electrophoretic particles D were quickly electrodeposited to the top electrode side while the black electrophoretic particles A were quickly electrodeposited to the bottom electrode side. When seen from the top substrate surface, a white color was observed. Next, when a voltage of −20 V was applied to the top electrode, the black electrophoretic particles A were quickly electrodeposited to the top electrode side while the white electrophoretic particles D were quickly electrodeposited to the bottom electrode side. When seen from the top substrate surface, a black color was observed. Further, light reflectivity of the white display (a rate of a reflected light amount with respect to white incident light amount) was 40%. When this white display state was maintained without applying a voltage, the light reflectivity decreased to 15% in about 100 seconds.

The image display device of the present invention can be applied as, for example, a substitute for a paper medium which can be easily carried and record a display, and a substitute for a display device such as a CRT and a flat panel upon being combined with a recording device and a transmitter.

According to at least one embodiment of the present invention, an electrophoretic dispersion solution having bistability whereby stable electrophoretic mobility and a stable static state can be realized, and an image display medium and an image display device using this electrophoretic dispersion solution, can be provided.

This patent application is based on Japanese Priority Patent Application No. 2008-174865 filed on Jul. 3, 2008, the entire contents of which are hereby incorporated herein by reference.

What is claimed is:

1. An electrophoretic dispersion solution comprising:
a nonpolar solvent; and
plural kinds of electrophoretic particles,
wherein at least one kind of the electrophoretic particles has, on surfaces, a copolymer including a first monomer that has a charged group and a second monomer expressed by a first formula represented as

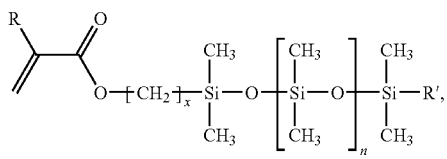

where R denotes a hydrogen atom or a methyl group, R' denotes a hydrogen atom or an alkyl group with a carbon number of 1 through 4, n is a natural number, and x denotes an integer of 1 through 3; and
at least another kind of the electrophoretic particles has, on surfaces, a polymer including a third monomer expressed by a second formula represented as

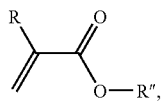

as a component of the polymer, where R denotes a hydrogen atom or a methyl group and R'''' denotes an alkyl group with a carbon number of 4 or larger.

2. The electrophoretic dispersion solution as claimed in claim 1, wherein the first monomer includes a monomer expressed by a third formula represented as

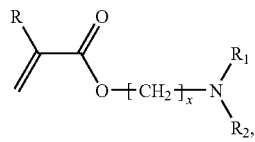

where R, $R_1$, and $R_2$ independently denote a hydrogen atom or a methyl group and x denotes an integer of 1 through 3.

3. The electrophoretic dispersion solution as claimed in claim 1, wherein the first monomer includes a monomer expressed by a fourth formula represented as

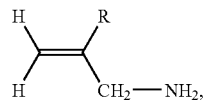

where R denotes a hydrogen atom or a methyl group.

4. The electrophoretic dispersion solution as claimed in claim 1, further comprising a dispersion agent.

5. An image display medium comprising:
a pair of electrodes, one of said electrodes being capable of transmitting light; and
the electrophoretic dispersion solution as claimed in claim 1 filling in between the electrodes, said electrophoretic dispersion solution being divided into plural micro spaces defined by one or more partitions.

6. An image display device comprising the image display medium as claimed in claim 5 and a control part configured to control a display of the image display medium.

7. An image display device comprising:
an image display medium including a pair of electrodes, one of said electrodes being capable of transmitting light; and an electrophoretic dispersion solution filling in between the electrodes, said electrophoretic dispersion solution including a nonpolar solvent and plural kinds of electrophoretic particles, in which at least one kind of the electrophoretic particles has, on surfaces, a copolymer including a first monomer that has a charged group and a second monomer expressed by a first formula represented as

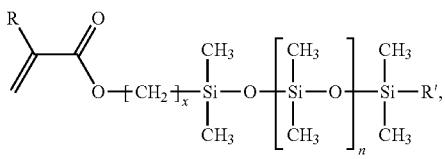

where R denotes a hydrogen atom or a methyl group, R' denotes a hydrogen atom or an alkyl group with a carbon number of 1 through 4, n is a natural number, and x denotes an integer of 1 through 3; and
at least another kind of the electrophoretic particles has, on surfaces, a polymer including a third monomer expressed by a second formula represented as

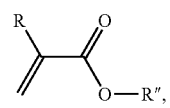

as a component of the polymer, where R denotes a hydrogen atom or a methyl group and R'''' denotes an alkyl group with a carbon number of 4 or larger, said electrophoretic dispersion solution being divided into plural micro spaces defined by one or more partitions; and
a control part configured to control a display of the image display medium.

* * * * *